July 20, 1965 J. C. MORRISS, JR 3,195,206
BAND GRIPPING MEANS FOR PIPE CLAMP HAVING MALLEABLE JAWS
Filed Aug. 14, 1963

INVENTOR.
JAMES C. MORRISS, JR.
BY
ATTORNEY

United States Patent Office 3,195,206
Patented July 20, 1965

3,195,206
BAND GRIPPING MEANS FOR PIPE CLAMP
HAVING MALLEABLE JAWS
James C. Morriss, Jr., Belmont, Calif., assignor to Smith-Blair, Inc., San Francisco, Calif., a corporation of California
Filed Aug. 14, 1963, Ser. No. 302,114
1 Claim. (Cl. 24—279)

This invention relates to pipe repair clamps of the type in which rigid lugs are used to bring together the ends of a malleable band that extend around the pipe. More particularly, the invention relates to an improved structure for securing the ends of the band to the lugs.

Pipe clamps utilizing the malleable band attached to rigid lugs are now widely used because of their versatility and effectiveness in meeting various conditions. In more recently developed clamps the problem of bolt bending due to the tendency of the lugs to tip as the bolts are tightened has been largely overcome, and in these improved clamps greater amounts of torque can be applied to draw the lugs together. However, the ability of the lugs to withstand a greater band tightening force increased the problem of securing the ends of the malleable band to the lugs. Accordingly, a general object of the present invention is to provide an improved pipe clamp structure for connecting the malleable bands to a pair of rigid lugs so that the band cannot possibly slip from the lugs or break loose from them, even when an unusually large tightening force is applied to draw the lugs together.

Since the early development of pipe clamps there has been a sustained effort to provide a connecting structure for attaching the lugs to the flexible band that not only had adequate strength but also was practical and inexpensive to manufacture. In an early form of pipe clamp the attachment of the band to the lug was accomplished by crimping the band ends into milled slots in the lugs. However, the milling operation was an expensive manufacturing step, and moreover this connection was often not tight enough, the band ends tending to slip out of the slot when pressure was applied during the tightening of the bolts. Any slipping of the band away from the lug made the clamp useless. In other later forms of clamps, attempts were made to solve the problem by the use of auxiliary wedges and rods retained by portions of the lugs to hold the band ends in place. In addition to the extra parts required, this latter attachment method also required complicated manufacturing steps and thus increased the overall cost of the clamps. In a more recent development in the pipe clamp art, as disclosed in U.S. Patent No. 3,089,212, the lugs are cast from a malleable metal material with jaw portions originally in the open position which can be closed together on the end of the band.

Another object of the present invention is to provide a pipe clamp utilizing the aforesaid feature of bendable lug jaws of malleable material in combination with a unique structure on the inner surfaces of the lug jaws adapted to grip the end portion of a malleable band to connect the jaws firmly thereto when they are closed.

A further important object of my invention is to provide an improved means for attaching the ends of a malleable band to a pair of rigid lugs that is particularly well adapted for ease and economy of manufacture.

Still another object of the invention is to provide an improved means for attaching a malleable band to a pair of rigid pipe clamp lugs which requires no precise recesses or projections on either of the lug jaws. In accordance with the invention, lugs made from malleable material and originally cast in the spread apart or open position are constructed with a multiplicity of particles on one or both of the inner surfaces of the lug jaws, and these particles have a hardness which enables them to penetrate the portion of the band between the lug jaws as the jaws are closed. The result is a strong locking connection between the malleable band and the lugs which prevents any movement or slippage of the band even when large forces are exerted in drawing the lugs together.

Other objects, advantages and features of the invention will become apparent from the following detailed description, and from the drawings, in which.

Figure 1:
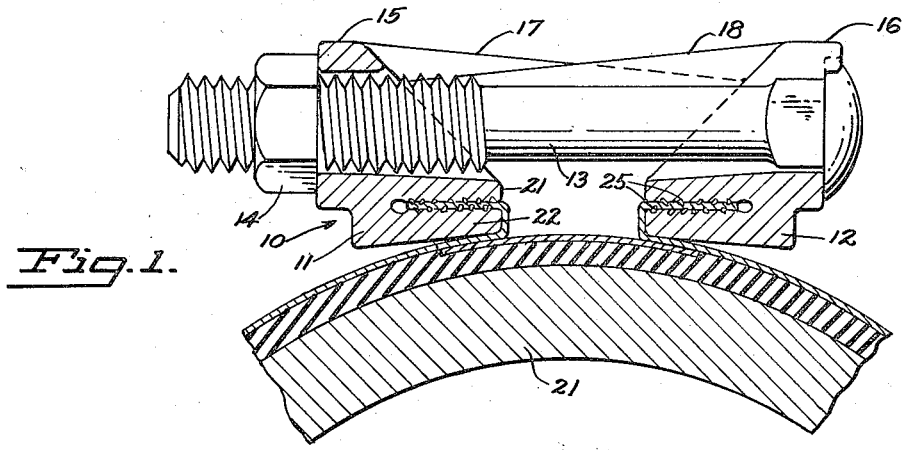
FIG. 1 is a view in elevation and in cross section showing a pair of pipe clamp lugs having a band attaching means embodying the principles of the invention.

Referring to the drawings, FIG. 1 shows a cross sectional view of a pipe clamp 10 embodying the principles of the invention. Generally, the clamp comprises a pair of lug members 11 and 12 that are connected by a series of bolts 13, each having a nut 14 threaded to one end thereof, and thus adapted to move the lugs towards each other when the nuts are tightened. The lug members 11 and 12 that are shown are preferably provided with upwardly extending projections 15 and 16 that are spaced apart along the lugs for supporting the bolts and nuts. The lugs also have a number of stabilizing fingers 17, each of which extends across to and bears on the upper surface of the opposite lug to prevent the lugs from tipping as the bolts are tightened.

The lugs 15 and 16, as shown, may have any desired length and thus any number of bolts 13, depending on the size of the pipe break being repaired. More details concerning the placement and spacing of the bolts may be found in the aforesaid U.S. Patent No. 3,089,212. While I have shown, for illustrative purposes, a form of lugs having stabilizing fingers 17, it is to be understood that the present invention is not in any way concerned with such fingers, and thus is not limited to lugs having them.

Figure 2:
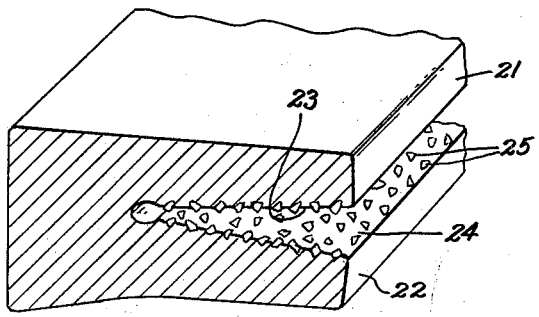
FIG. 2 is an enlarged fragmentary view in section and in perspective showing one of the lugs of FIG. 1 with the jaws in the open position.

As shown in FIG. 1, the lugs 11 and 12 are each connected to one end of a flexible band or sleeve 18 of a malleable metal material that extends around a gasket 19 covering the leak in the pipe 20 being repaired. The lugs are made from malleable iron or some other suitable metal material which can be bent or coined after casting instead of being brittle like cast iron, for example. Both of the lugs 11 and 12 can be essentially identical in all respects relating to the features of the invention, and each is formed with upper and lower jaw portions 21 and 22. When the lugs are cast the jaws are in the open position with their inside surfaces 23 and 24, respectively, spread apart, as shown in FIG. 2. Embedded within the jaw portions 21 and 22 and extending above their inside surfaces 23 and 24 are a multiplicity of jagged or sharp edged particles 25 that are dispersed randomly. The particles have a hardness characteristic which is greater than the malleable band and also the lugs themselves. Although several materials are suitable for this purpose, we have found that silicon carbide grit particles fulfills the requirements of the invention.

In the embodiment of FIGS. 1 and 2, the hard locking particles 25 are embedded directly in the jaw portions 21 and 22 of the lugs during the casting process. In this process the particles are first applied to a core for forming a slot between the jaw portions, and during the casting process the grit particles are transferred from the core to the finished casting. The normal thickness of the band in most pipe clamps is rarely more than .045 inch, and the hard grit particles 25 when embedded preferably extend above the surfaces of the jaw portions a somewhat less amount. As the jaws are closed the projecting particles 25 are pressed into the band and provide a firm locking action.

Figure 3:
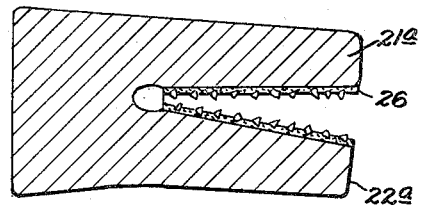
FIG. 3 is a fragmentary view in section showing a somewhat modified form of lug embodying the principles of the invention.
Figure 4:
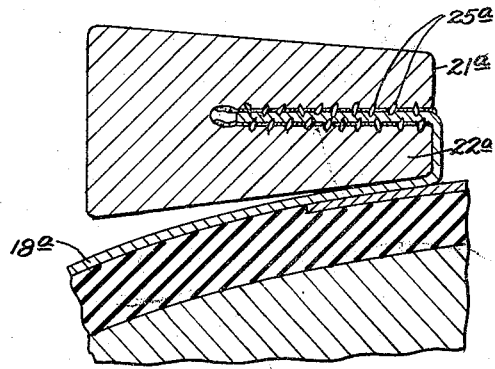
FIG. 4 is a fragmentary view in section showing the lug of FIG. 3 in the closed position.

In a somewhat modified form of the invention shown in FIGS. 3 and 4, the grit particles 25a are applied to and retained on the open jaws 21a and 22a by means of an adhesive vehicle rather than by casting the abrasive particles directly in the members. In this embodiment, the particles 25a are suspended in a thin layer 26 of adhesive material such as epoxy spread on each of the inner surfaces 23a and 24a of the lug jaws. When the lug jaws are pressed together against the end portions of the band the adhesive layer 26 is compressed and abrasive particles 25a penetrate both the lug jaw portions and the band itself to form a locking connection between these two surfaces.

From the foregoing it should be apparent that in both forms of the invention the unique combination of a multiplicity of particles of greater hardness embedded in or supported along the surfaces of originally spread apart jaw portions and a malleable band portion between the jaws will provide a highly effective means for connecting the ends of a band to pipe clamp lugs when the jaws are closed. Not only does my invention eliminate the necessity for precisely cast recesses and projections in either the lug jaw portions or in the band itself, but it provides a connection that will absolutely prevent any slipping of the band between the jaws after they have once been closed against the band portion.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

In a pipe clamp of the type having a malleable band with ends secured to a pair of rigid lugs and bolts for drawing the lugs together to tighten the band around a pipe, the improvement comprising: a bendable pair of malleable jaws on said lugs, said lugs being originally cast with said jaws in the open position with inner jaw surfaces that diverge outwardly from a junction of said jaw surfaces extending longitudinally along the lugs, a multiplicity of sharp edged irregular shaped interlocking members randomly located on and fixed to at least one of said inner jaw surfaces, said interlocking members being fragments of a material having a natural hardness greater than both said band and said lug jaws, said fragments being at least partially embedded in the end of said band and in at least one of said jaws when said jaws are closed together on an end of said band located between said inner jaw surfaces.

References Cited by the Examiner

UNITED STATES PATENTS

| | | | |
|---|---|---|---|
| 50,688 | 10/65 | Cogan | 24—265 |
| 628,882 | 7/99 | Werner | 24—284 |
| 2,576,528 | 11/51 | Matthysse. | |
| 2,765,000 | 10/56 | Bond. | |
| 3,088,185 | 5/63 | Smith | 24—279 |
| 3,089,212 | 5/63 | Graham et al. | 24—279 |
| 3,089,233 | 5/63 | Meier | 24—23 X |

FOREIGN PATENTS

| | | |
|---|---|---|
| 571,662 | 3/59 | Canada. |

DONLEY J. STOCKING, *Primary Examiner*.